United States Patent [19]

Hatch

[11] 3,989,968
[45] Nov. 2, 1976

[54] PUMPED DOUBLE-PASS RETURN LIQUID METAL COLLECTOR FOR ACYCLIC MACHINES

[75] Inventor: Burton D. Hatch, Saratoga, N.Y.

[73] Assignee: General Electric Company, Schenectady, N.Y.

[22] Filed: Oct. 23, 1975

[21] Appl. No.: 625,168

[52] U.S. Cl. .............................. 310/219; 310/178; 310/11; 417/50
[51] Int. Cl.² ....................................... H01R 39/00
[58] Field of Search ............... 310/178, 219, 11; 417/50

[56] References Cited
UNITED STATES PATENTS

| | | | |
|---|---|---|---|
| 2,990,485 | 6/1961 | Lee | 310/178 |
| 3,135,208 | 6/1964 | Stuetzer | 417/50 |
| 3,143,673 | 8/1964 | Donaldson | 310/11 |
| 3,211,936 | 10/1968 | Harvey | 310/178 |
| 3,270,228 | 8/1966 | Rioux | 310/178 |
| 3,436,575 | 4/1969 | Harvey | 310/219 |
| 3,453,467 | 7/1969 | Harvey | 310/178 |
| 3,546,508 | 12/1970 | Harvey | 310/219 |
| 3,585,422 | 6/1971 | Burnier et al. | 310/11 |
| 3,854,065 | 12/1974 | Rioux et al. | 310/11 X |

*Primary Examiner*—Donovan F. Duggan
*Attorney, Agent, or Firm*—Marvin Snyder; Joseph T. Cohen; Jerome C. Squillaro

[57] ABSTRACT

To assure availability of liquid metal for operation of liquid metal electrical current collectors in an acyclic machine at all operating speeds of the machine, liquid metal expelled electromagnetically from the region between an individual rotor collector ring and an individual stator collector ring is made to flow a second time in the same direction across a path followed by the armature current so that the liquid metal is pumped electromagnetically back into the region from which it is expelled.

15 Claims, 11 Drawing Figures

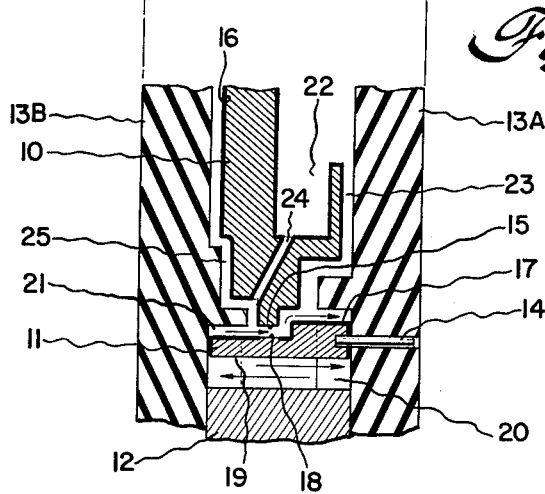
Fig. 1
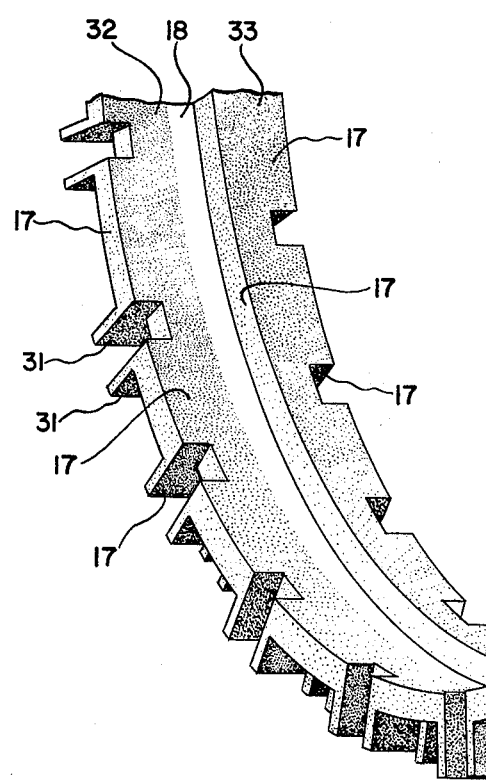
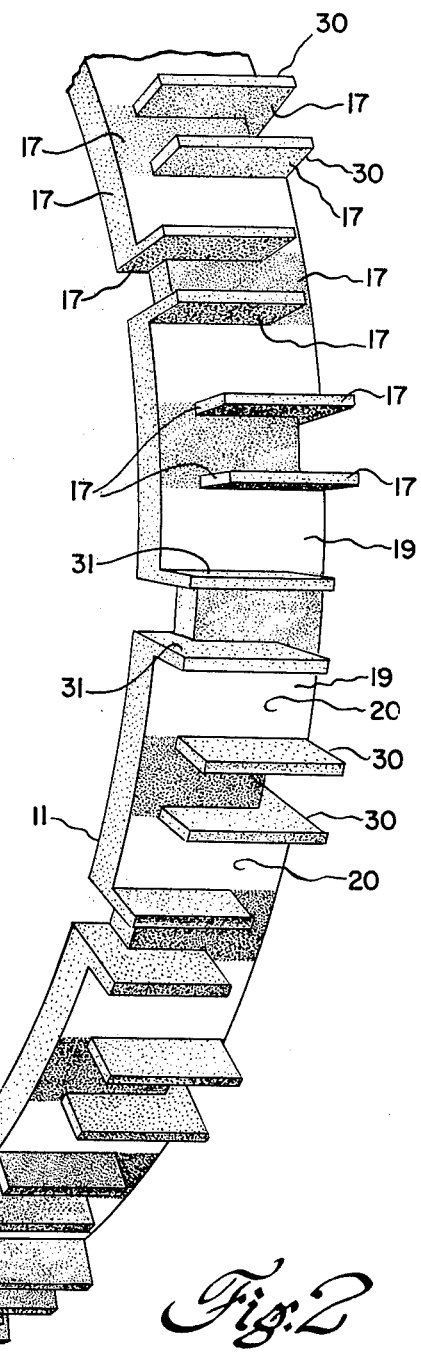
Fig. 2

PUMPED DOUBLE-PASS RETURN LIQUID METAL COLLECTOR FOR ACYCLIC MACHINES

INTRODUCTION

This invention relates to acyclic machines employing liquid metal electrical current collectors, and more particularly to a method and apparatus which permit such machines to operate, unflooded with liquid metal, under all attainable conditions of speed.

In any closed conductive loop carrying an electrical current, the magnetic field produced by the current interacts with the current, creating a force acting on each portion or element of the conductor. This force always acts in an outward direction so as to tend to enlarge the area bounded by the closed loop.

In an acyclic machine using, instead of solid brushes, liquid metal collectors on a collector ring, the liquid metal forms a portion of the current-carrying loop. Hence the same force is generated in the liquid metal as in the solid electrical conductor portions of the machine. While the solid conductors (e.g. copper) may be mechanically supported through solid electrical insulation, rotation of the collector rings precludes such positive containment of the liquid metal employed in place of brushes.

In generator applications, the liquid metal may be introduced into the collector gap after a suitable minimum speed has been attained by the rotor and removed whenever rotor rotational speed decreases below such minimum speed. Thus centrifugal force generated within the liquid as it is caused to rotate by the rotating collector ring has, in generator applications, been successfully employed to retain the liquid metal in the collector site above this minimum rotor speed. This is shown, for example, in L. M. Harvey, U.S. Pat. Nos. 3,211,936, issued Oct. 12, 1965, and 3,546,506, issued Dec. 8, 1970, both of which are assigned to the instant assignee.

In motor applications, such as for ship propulsion, capability of applying full torque (and overload torques) at any and all rotor speeds in both directions of rotation, including zero speed and emergency reversals, is essential. At zero and low rotor speeds, centrifugal force is either completely unavailable or insufficient to retain the liquid metal in the collector site. Without some other force to retain the liquid metal at the collector site, or to return to the collector site, the liquid metal will be expelled from the collector site and either the electric circuit will be broken or electrical arc-over will occur. In either case, the motor will then be inoperative. In disc-type acyclic machines only, a single armature circuit loop is involved. In drum-typed acyclic machines, wherever multiple drums are used a number of armature current loops are involved. Thus more ampere turns exist in the multiple drum-type machines, and the liquid metal expulsion forces are correspondingly multiplied. It is apparent that liquid metal must be retained at the collector site if an operative acyclic motor is to be constructed.

Accordingly, one subject of this invention is to provide a continuously-available liquid metal current collector for an acyclic machine.

Another object is to provide a current collector for an acyclic motor capable of functioning at all speeds of the motor.

Another object is to prevent, in an acyclic machine, complete electromagnetic expulsion of the supply of current-carrying liquid metal from a liquid metal current collector.

Briefly, in accordance with a preferred embodiment of the invention, an acyclic machine includes a rotor collector ring rotatable within a stator collector ring, and an intermediate collector electrode situated between the rotor and stator collector rings. The intermediate collector electrode carries a plurality of pairs of radially-outwardly-directed vanes, alternate pairs of vanes extending axially from opposite sides of the electrode for less than the entire axial width of the electrode. The entire surface area of the electrode is covered with an insulating coating except for a circumferentially-oriented strip on the inner circumferential surface of the electrode and the axially-oriented regions separating successive pairs of vanes on the outercircumferential surface of the electrode. Liquid metal is permitted to flow through passage among the collector rings and electrode such that continuous spiraling circulation about the circumferential cross section of the intermediate collector electrode, directed along both circumferential directions, occurs. A continuous current path between the rotor collector ring and stator collector ring is thus provided.

In accordance with another preferred embodiment of the invention, a method of counteracting the effects of Lorentz force on liquid metal in the current collector of an acyclic machine comprises passing electrical current from the rotor of the machine through the liquid metal between a rotor collector ring and an intermediate electrode so as to create an expulsion force on the liquid metal, and channeling liquid metal expelled from between the rotor collector ring and the intermediate electrode to return to a region between a stator collector ring and the intermediate electrode. Electrical current is also passed from the intermediate electrode to the stator collector ring so as to create a magnetohydrodynamic force on the liquid metal therebetween and pump the metal toward the inlet side of the region between the rotor collector ring and the intermediate electrode, thereby replenishing liquid metal expelled from between the rotor collector ring and the intermediate electrode.

BRIEF DESCRIPTION OF THE DRAWINGS

The features of the invention believed to be novel are set forth with particularly in the appended claims. The invention itself, however, both as to organization and method of operation, together with further objects and advantages thereof, may best be understood by reference to the following description taken in conjunction with the accompanying drawings in which:

FIG. 1 is an axial cross sectional view through a peripheral portion of an entire current collector assembly;

FIG. 2 is a perspective view of a portion of the intermediate collector electrode employed in the assembly shown in FIG. 1;

DESCRIPTION OF TYPICAL EMBODIMENTS

Figure 3:
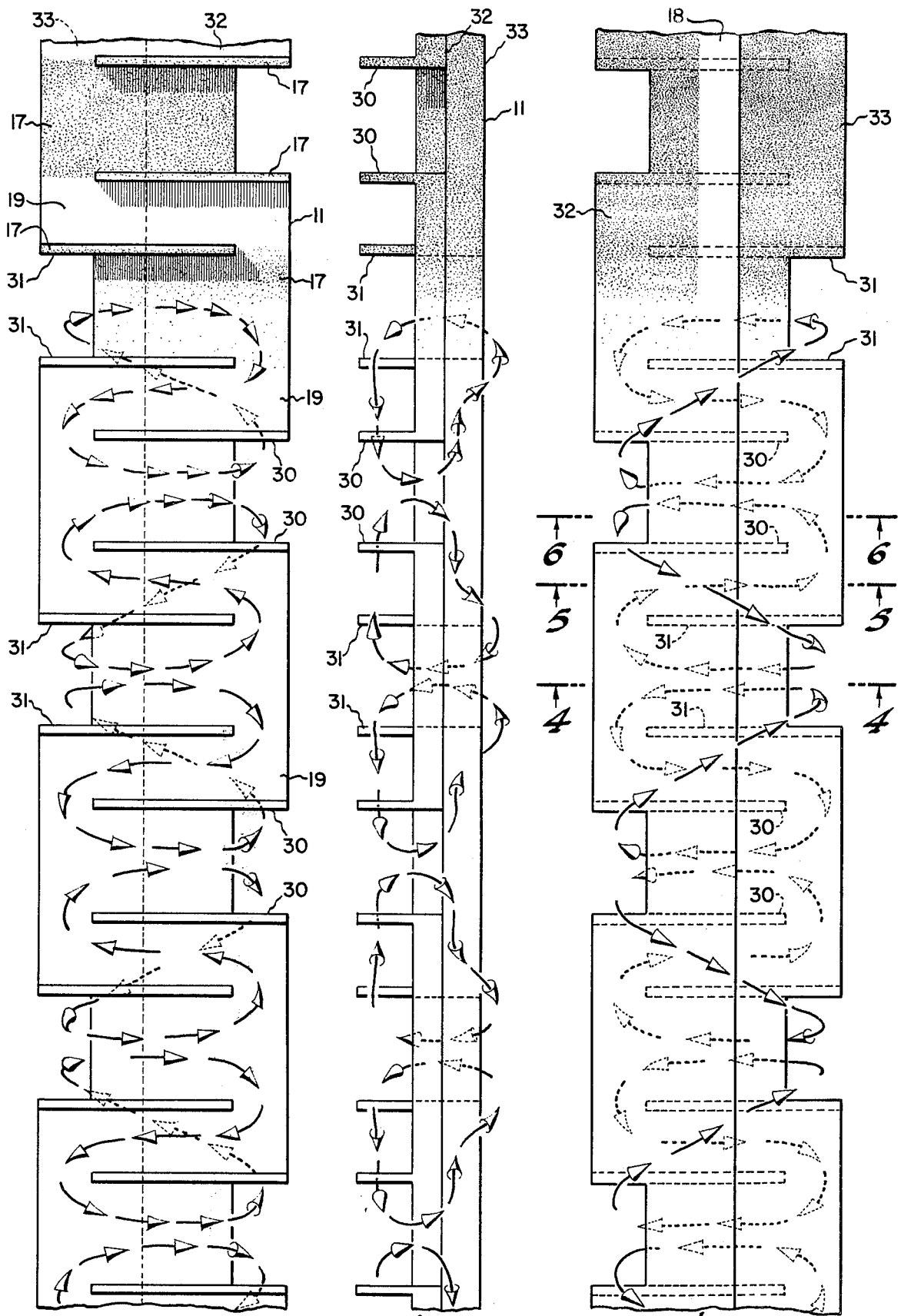
FIG. 3A is a plan view, in linear projection, of a portion of the outer circumferential of the intermediate collector electrode of FIG. 2, showing spiraling liquid metal flow paths about the electrode.
FIG. 3B is an axial end view of the linear projection of the intermediate collector electrode shown in FIG. 3A, showing spiraling liquid metal flow paths about the electrode.
FIG. 3C is a plan view, in linear projection, of a portion of the inner circumference of the intermediate collector electrode of FIG. 2, showing spiraling liquid metal flow paths about the electrode.

In FIG. 1, a rotor collector ring 10 is shown with all but its outermost surface 15 coated with an insulation 16. Rotor collector ring 10 is encircled by an annular intermediate collector electrode 11 which is completely coated with an insulation 17 on all but a portion 18 of its innermost surface and portions 19 of its outermost surface. Insulation 16 and 17 may each comprise a ceramic coating, such as sprayed alumina, which is subsequently vacuum-impregnated with an epoxy insulation.

Fitted about intermediate collector electrode 11 is a stator collector ring 12. Stationary, electrically-insulating disks 13A and 13B, such as an epoxy-fiberglass, are situated on either side of rotor collector ring 10 and are tightly fitted against stator collector ring 12 by pressure from annularly-arranged bolts (not shown). Intermediate collector electrode 11 is positively prevented from rotation by insulated keying means 14 such as an epoxy fiberglass, extending from disk 13A.

Passageways for flow of liquid metal are provided in the current collector assembly. A first, generally axially-directed passageway 20 between intermediate collector electrode 11 and stator collector ring 12 allows flow of liquid metal in either of two directions, as indicated by the arrows, depending upon what radial angle is selected for viewing the axial cross section. A second, generally annular passageway 21 between intermediate collector electrode 11 and rotor collector ring 10 allows expulsion flow of liquid metal in one direction, as indicated by the single arrow.

A chamber 22, which is provided within rotor collector ring 10, communicates with passageway 21 through a generally annular passageway 23 between the rotor collector ring and insulating disk 13A. A plurality of generally radially-directed passageways 24 are provided within rotor collector ring 10 which communicate with passageway 21 through a generally radially-directed passageway 25 between the rotor collector ring and disk 13B, and also communicate with chamber 22. Annular passageway 25 and chamber 22 are connected by insulated axial passageways (not shown for simplicity of illustration) near the rotor axis of rotation 56 in order to help assure equalization of cover gas pressures in the apparatus.

Intermediate electrode 11 is shown, in perspective view, in FIG. 2, illustrating passageway 20 between adjacent pairs of radially-outwardly-directed, axially-oriented vanes 30 and 31. Electrode 11 includes a first region 32 of substantially uniform inner and outer diameters, and a second region 33 of the same outer diameter but of a smaller, substantially uniform inner diameter. The entire surface of electrode 11, with the exception of circumferential interior surface portion 18 and exterior surface portions 19 separating successive pairs of vanes 30 and vanes 31 is coated with electrically-insulating epoxy 17. Vanes 30 extend from the edge of the thicker portion of electrode 11 to a location short of the opposite edge of electrode 11 to provide a liquid metal passageway around the ends of vanes 30 while vanes 31 extend from the edge of the thinner portion of electrode 11 to a location short of the edge of the thicker portion of electrode 11 to provide a liquid metal passageway around the ends of vanes 31. Between each pair of adjacent vanes 30, thicker region 33 of the electrode is notched through its radial thickness over a minor fraction of its axial extent. Similarly, between each pair of adjacent vanes 31, thinner region 32 of electrode 11 is notched through its radial thickness over a minor fraction of its axial extent.

FIGS. 3A, 3B and 3C are views which illustrate, schematically, flow paths of liquid metal around electrode 11 when assembled into an acyclic machine as described herein. For simplicity of description, electrode 11 is illustrated as linear apparatus in these FIGURES, although it is to be understood that the electrode is physically of annular configuration. Each of these FIGURES depicts the fact that the liquid metal moves circumferentially in reciprocal fashion over a plurality of small circumferential arcs.

In FIG. 3A, flow of liquid metal around each of vanes 30 and 31 is illustrated. The flows occur in continuous loops, circulating, for each path, axially across the outer surfaces of electrode 11 between adjacent vanes 30, radially inward through the notch therebetween, generally axially over the inner surfaces of electrode 11 on portions 32 and 33 thereof to either of the two nearest adjacent pairs of vanes 31 and radially outward through the notch therebetween, axially over the outer surface of electrode 11 and reversing axially over the outer surface around the adjacent vane 30 to the area between adjacent vanes 30. On each generally-axial pass of the liquid metal over the inner surface of electrode 11, electrical contact is made between the liquid metal and exposed surface 18 on narrow circumferential portion 32 of the electrode. Similarly, on each axial pass of the liquid metal over the outer surface of electrode 11 between any pair of adjacent vanes 30 and 31, electrical contact is made between the liquid metal and exposed surface 19 of the electrode. At all other locations on electrode 11, electrical contact between the liquid metal and electrode 11 is prevented by insulation 17.

In FIG. 3B, the path of liquid metal flow in the radial direction about intermediate 11 is illustrated. It is thus evident that flow of liquid metal leaving the area between adjacent vanes 30 flows radially inward to the inner surface of electrode 11 in region 32, thence further radially inward along the inner surface of electrode 11 onto region 33, thence radially outward to the area between adjacent vanes 31, and over the outer surface of electrode 11 around one of the adjacent vanes 31 and around the adjacent vane 30 back to the area between adjacent vanes 30.

FIG. 3C shows the flow paths of liquid metal over the inner surface of intermediate collector electrode 11, illustrating passage of the liquid metal over circumferentially-oriented uninsulated portion 18, which may be continuous, and over the radially-inwardly-stepped portion 33 of the inner surface of the collector electrode.

Figure 4:
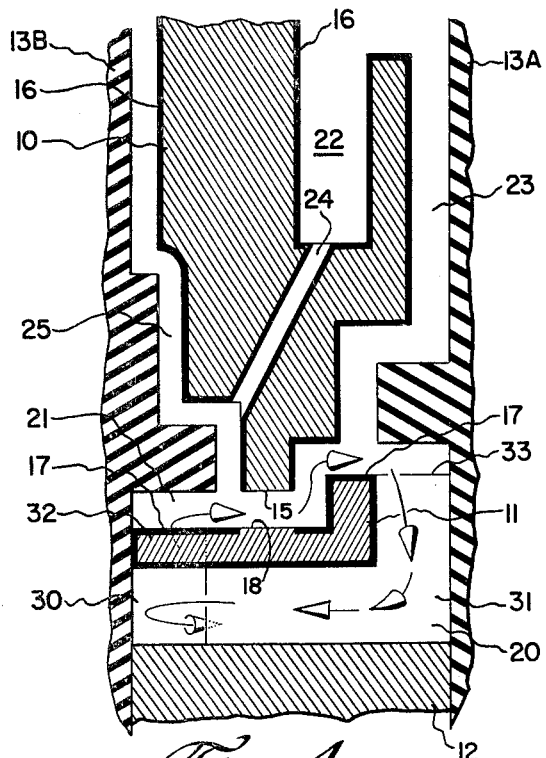
FIGS. 4, 5 and 6 are axial cross sectional views through peripheral portions of an entire current collector assembly taken at locations 4—4, 5—5 and 6—6, respectively, along the intermediate collector electrode shown in FIG. 3C.

In FIG. 4, which is represents a cross section of a region of the liquid metal electrical current collector of the instant invention, taken at the radial location of line 4—4 shown in FIG. 3C, the flow of liquid metal through the collector region is illustrated as passing from the inner surface of region 33 radially outward and axially in front of vane 31 of intermediate collector electrode 11, and then passing circumferentially and reversing axially to flow behind the vane. The liquid metal next emerges into view flowing radially inward from behind vane 30 and passes axially across region 32 of electrode 11, being insulated from the electrode by epoxy insulation 17 except at uncoated surface portion 18. The liquid metal continues its flow by moving radially inward onto region 33 of electrode 11 and continuing axially prior to flowing radially outward in front of vane 31. Thus armature current passes through the liquid metal only once at this location, from uninsulated periphery 15 of rotor collector ring 10 through the liquid metal to electrode 11. Because of the presence of insulation 17 on the outer circumferential surface of intermediate collector electrode 11, armature current at this circumferential location on the intermediate collector electrode does not pass straight through the electrode between the rotor and stator collector rings.

Figure 7:
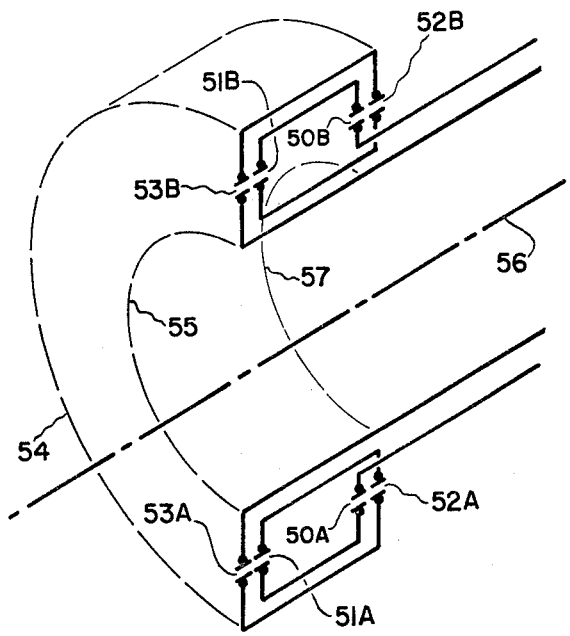
FIG. 7 is a schematic illustration of armature current paths in a two-drum (i.e., four-collector) acyclic machine with liquid metal current collectors.

The liquid metal is expelled axially between rotor collector ring 10 and intermediate electrode 11 due to an electromagnetic Lorentz force created by current flow through the liquid metal itself. In a typical, relatively high voltage acyclic drum-type machine a plurality of rotor collector rings and stator collector rings are employed, and are connected in series in a manner which forms a plurality of current loops. Such connection occurs when the rotor and stator collector rings are integrated into drum configurations. This is illustrated schematically in FIG. 7 wherein a single circuit exhibits current flow in series through a plurality of liquid metal current collectors 50A, 51A, 52A and 53A between each of two drum-type rotors and two drum-type stators, and in series through a plurality of current collectors 50B, 51B and 52B and 53B between each of the two drum-type rotors and two drum-type stators. The general configuration of the machine is outlined by curved lines 54, 55 and 57, all situated about axial center of rotation 56.

Figure 8:
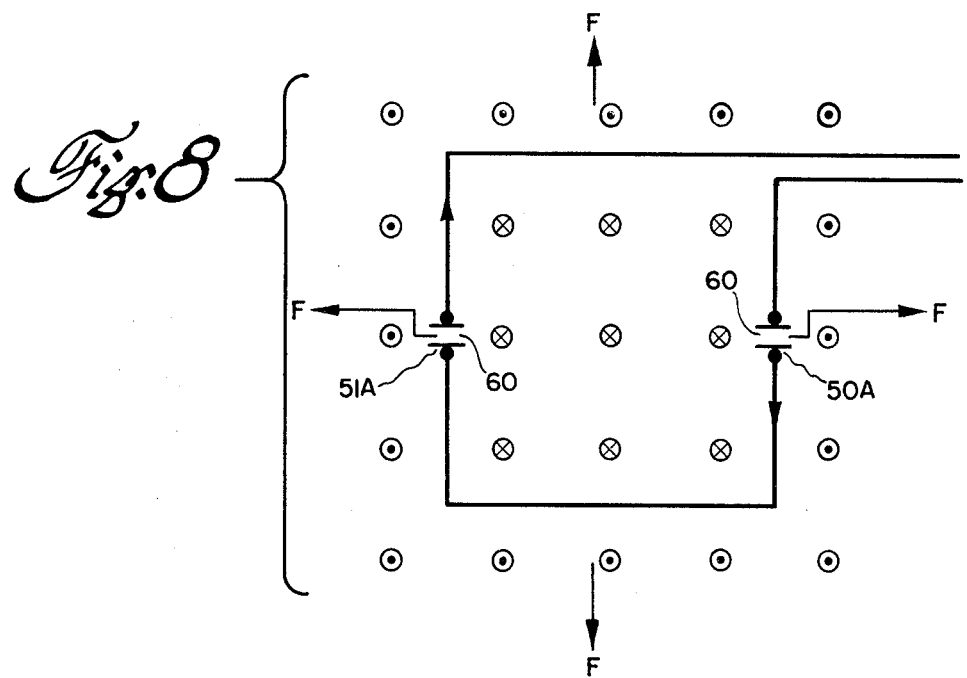
FIG. 8 is a schematic illustration of the magnetic field induced by armature current flow through a single conductive loop formed by two rotor and stator collector rings connected in a drum configuration, using conventional current collectors.

In FIG. 8, a single current loop formed by the series connection of current collectors 50A and 51A is illustrated. A magnetic field created by conventional current flow in the indicated direction is established in a downward direction into the plane of the illustration inside the current loop, and in an upward direction out of the plane of the illustration outside of the current loop, as indicated by ⊗ and ⊙ respectively. This results in an outward force, known conventionally as the Lorentz force, along the entire perimeter of the current loop in the direction of arrows F. The Lorentz force thus acts in a direction tending to enlarge the area of the current loop. However, assuming liquid metal 60 is employed to carry the current from one side of current collector 50A to the other, and from one side of current collector 51A to the other, the liquid metal will be unable to withstand the expulsion force and will be physically expelled from the circuit, thus interrupting the circuit and disabling the acyclic machine, unless other forces or flows prevent such expulsion.

Figure 9:
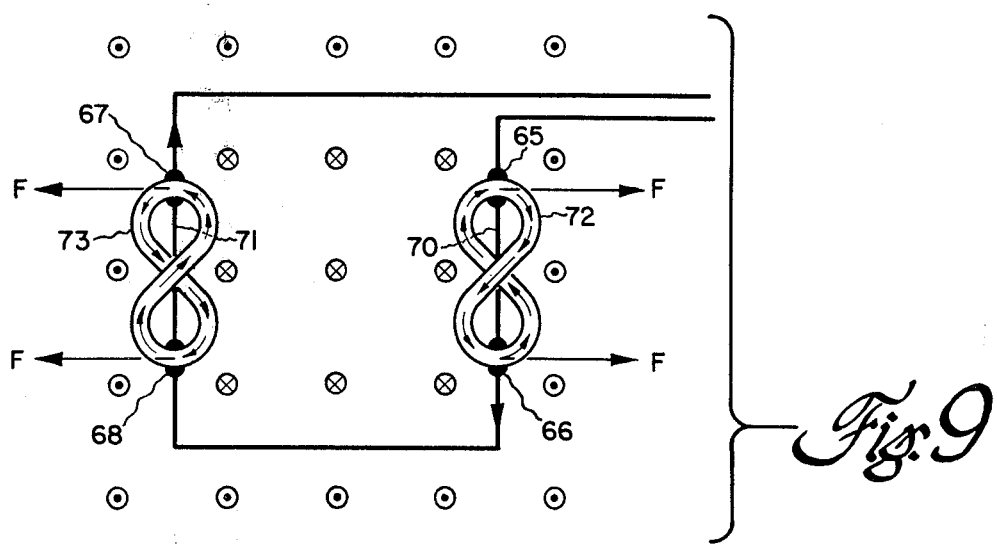
FIG. 9 is schematic illustration of the current loop of FIG. 8 employing current collectors of the type described in the instant invention.

In FIG. 9, the principle employed in the instant invention to continuously replenish expelled liquid metal is illustrated. Double liquid metal collectors 65 and 66, and 67 and 68, are employed, with a single conductor 70 electrically interconnecting collectors 65 and 66, and a single conductor 71 electrically interconnecting collectors 67 and 68. Collectors 65 and 66 are formed in a double reversed loop (i.e., "figure eight") configuration 72, while collectors 67 and 68 are formed in a double reversed loop configuration 73. Thus the Lorentz force F due to current flow through the circuit tends to expel liquid metal in collectors 65, 66 and 67 and 68 in the direction indicated. However, because of the reversed loop configuration urations, liquid metal expelled from collector 65 is channeled to flow to collector 66 while liquid metal expelled from collector 66 is channeled to flow to collector 65, in the directions indicated by arrows in double reversed loop 72. Similarly, liquid metal expelled from collector 67 is channeled to flow to collector 68 while liquid metal expelled from collector 68 is channeled to flow to collector 67, in the directions indicated by arrows in double reversed loop 73. In this manner, liquid metal at each of the current collectors is continuously replenished. In an acyclic motor, this liquid metal replenishment assures a continuously-functioning liquid metal current collector at all motor torques and speeds.

Figure 5:
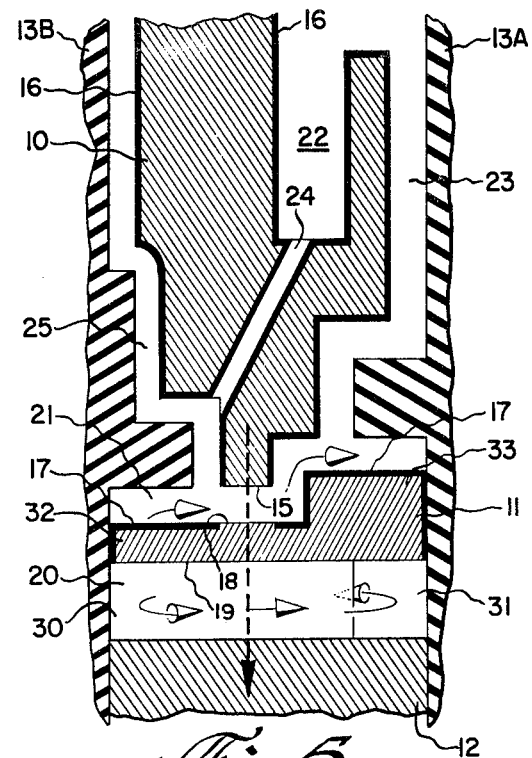

The flow path of liquid metal behind vane 31 of FIG. 4 is shown in FIG. 5, which represents a cross section of a region of the liquid metal electrical current collector of the instant invention, taken at the radial location of line 5—5 shown in FIG. 3C. The liquid metal path is thus seen as having reversed its axial direction in the space between intermediate electrode 11 and stator collector ring 12. The flow direction of liquid metal here is brought about by Lorentz forces, in the manner described in conjunction with the schematic illustration of FIG. 9. More specifically, armature current in this configuration flows from uninsulated surface 15 of rotor collector 10 to intermediate electrode 11 through the liquid metal and uninsulated surface 18 of electrode 11. Thus, flow of liquid metal over inner circumferential surfaces 32 and 33 of intermediate electrode 11 is in the same direction as indicated in FIG. 4. In this region, liquid metal is being electromagnetically expelled axially due to the Lorentz force thereon. However, the armature current continues through electrode 11, emerging through uninsulated surface 19 thereof, and passes through the liquid metal to stator 12. Consequently, liquid metal flow over uninsulated outer circumferential surface 19 of intermediate electrode 11 between adjacent vanes 30 and 31 occurs in an axially opposite direction to the liquid metal flow over the outer circumferential surface of intermediate electrode 11 between adjacent pairs of vanes 31, as shown in FIG. 4. This follows from the fact that, at the location illustrated in FIG. 5, armature current flows through the liquid metal on uninsulated outer circumferential surface 19 of intermediate electrode 11 in the same direction as through the liquid metal on inner circumferential surfaces 32 and 33 of the intermediate electrode, as indicated by the dotted arrow.

Upon reaching the axial end of vane 31, the liquid metal flows circumferentially behind vane 30 and then axially in the opposite direction over the outer circumference of intermediate electrode 11. At the same time, flow of liquid metal over the inner surface of intermediate electrode 11 at its thicker region 33 moves upward out of the plane of the illustration. Thus it is clear that, as shown in FIG. 5, the same armature current pumps liquid metal with equal magnetohydrodynamic force twice, causing it to circulate through the current collector. The equality of the magnetohydrodynamic forces results from the fact that both forces are created by the same armature current. By thus passing armature current a second time through the liquid metal so as to pump the liquid metal back through the collector site with a force equal to the expulsion force and thereby continuously replenish the liquid metal at the same quantitative rate as it is expelled, it becomes practicable to assure a continuously functioning liquid metal collector at all motor torques and at all motor speeds including those occurring during abrupt reversals of motor rotation.

The purpose of fabricating intermediate electrode 11 with one (or more) reduced inner diameters in region 33 is to provide an element of the fluid flow impedance to the Lorentz expulsion force acting between collector ring 10 and intermediate electrode 11 which is of sufficient magnitude to correspond to, and be dynamically balanced with, the Lorentz force acting between intermediate electrode 11 and stator collector ring 12. As these equally balanced (although of variable magnitude) Lorentz forces act on essentially constant and correspondingly proportioned flow impedances, the flow of liquid metal out of the rotor collector gap remains equal to the returninng flow into the collector gap under all operating conditions.

During high speed operation, rotor collector ring 10 imparts high centrifugal force to liquid metal flowing between it and electrode 11, especially in the vicinity of surface 15. This centrifugal force creates a pressure on the liquid metal. If this centrifugally-created pressure is sufficiently high, liquid metal can be directed back into chamber 22. Once in chamber 22, however, centrifugal force on the liquid metal causes it to return through passageway 24 and thence passageway 25, to the region between rotor collector ring 10 and intermediate electrode 11. At the same time, cover gas of the type commonly used with generators employing liquid metal current collectors remains behind and may be drawn off from chamber 22 in a radially-inward direction. Hence chamber 22 provides temporary liquid metal storage during high speed operation, while facilitating removal of cover gas which has been ingested by the liquid metal due to turbulence or foaming in the metal. By thus removing entrained cover gas, electrical conductivity of the liquid metal is maintained at a high level. This is described in greater detail in B. D. Hatch application Ser. No. 625,130 filed Oct. 23, 1975, filed concurrently herewith and assigned to the instant assignee.

Figure 6:
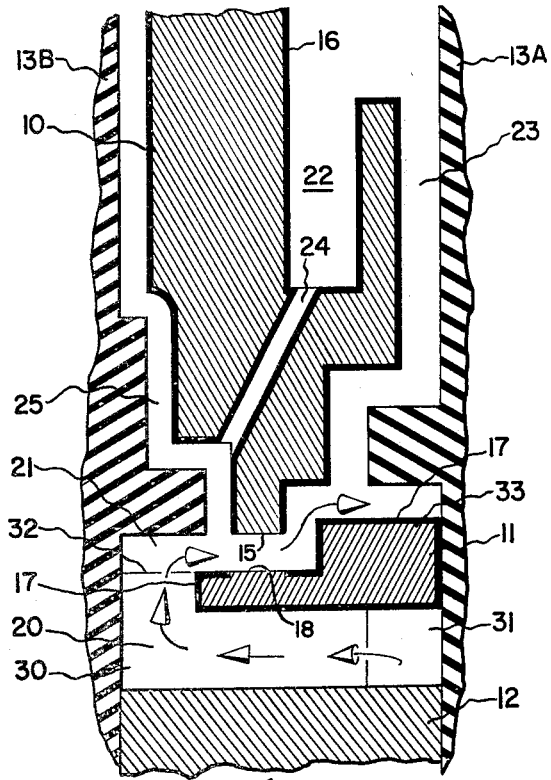

In FIG. 6, which represents a cross section of a region of the liquid metal electrical current collector of the instant invention, taken at the radial location of line 6—6 shown in FIG. 3C, the flow path of liquid metal in the collector region is illustrated as passing circumferentially from behind vane 30 over insulated portion 17 of the outer circumferential surface of intermediate collector electrode 11, axially in front of vane 30. The liquid metal then passes radially inward and axially across the inner circumferential surfaces of portions 32 and 33 of the intermediate collector electrode, during which the liquid metal contacts uninsulated surface 18 of the intermediate electrode. At the extreme axial end of the flow over the innner circumferential surface of electrode 11 in region 33, the liquid metal travels radially outward behind vane 31. Thus at this collector location, as at the location shown in FIG. 4, armature current from rotor collector ring 10 reaches intermediate electrode 11 by passing through the liquid metal between uninsulated portion 15 of the rotor collector ring and uninsulated portion 18 of intermediate collector electrode 11. However, armature current here is precluded from continuing on through intermediate collector electrode 11 to stator collector ring 12 because of presence of insulation 17 on the outer circumferential surface of the intermediate collector electrode. Hence at this location, as at the location shown in FIG. 4, no return pumping of the liquid metal by the armature current occurs.

When the rotor of a conventional acyclic motor of the liquid metal collector type is stationary, all the liquid metal falls to the bottom of the collector rings, completely filling a chord subtending an angle $\theta$ at the bottom of the motor. All the armature current is thus required to flow through the arcs of the collector rings contained within this chord, causing an increase in current density by a factor $360°/\theta°$ as compared with high speed operation when the liquid metal is distributed around the whole periphery of the current collector. However, the increased current density increases the liquid metal expulsion force and liquid metal pumping force equally, leaving operation of the motor unaffected thereby. On the other hand, when the pumped portions of the armature circuit are uniformly distributed around the inner periphery of the stator collector ring, the same changes occur automatically in the pumped liquid metal portions of the armature circuit as in the expelled liquid metal portions of the armature circuit. Hence the liquid metal replenishment rate equals the liquid metal expulsion rate under all these electrical variations.

The foregoing describes a continuously-available liquid metal current collector for an acyclic machine. The current collector provides capability for an acyclic motor to function at all speeds. The invention serves to prevent, in an acyclic machine employing such liquid metal current collector, electromagnetic expulsion of the liquid metal from the current collector.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. In an acyclic machine including a rotor collector ring rotatable within a stator collector ring, apparatus providing a continuous electrical current path therebetween comprising:
   an intermediate collector electrode situated between said rotor collector ring and stator collector ring, said intermediate collector electrode carrying a plurality of pairs of radially-outwardly-directed vanes, alternate pairs of said vanes extending axially from axially opposite sides of said electrode for less than the entire axial width of said electrode;
   an insulating coating covering the entire surface area of said electrode except for a circumferentially-oriented strip on the inner circumferential surface of said electrode and the axially-oriented regions separating successive pairs of vanes on the outer circumferential surface of said electrode; and liquid metal situated between said rotor collector ring and said intermediate collector electrode, and situated between said intermediate collector electrode and said stator collector ring.

2. The apparatus of claim 1 including means retaining said intermediate collector electrode and said stator collector ring in a common rotational condition with respect to said rotor collector ring.

3. The apparatus of claim 1 wherein axial width of said intermediate collector electrode is reduced in the region between the vanes of each of said plurality of pairs thereof.

4. The apparatus of claim 1 wherein said intermediate electrode is of two different inner diameters.

5. The apparatus of claim 2 wherein said intermediate electrode is of two different inner diameters and of reduced axial width in the region between the vanes of each of said plurality of pairs thereof.

6. The apparatus of claim 3 wherein said intermediate electrode is of two different inner diameters.

7. An electrical current collector for an acyclic machine comprising:
a rotor collector ring;
a stator collector ring encircling said rotor collector ring;
an intermediate electrode situated between said rotor collector ring and said stator collector ring; and
liquid metal situated between said intermediate electrode and each of said rotor collector ring and said stator collector ring, said liquid metal conducting electrical current between said rotor collector ring and said intermediate electrode so as to create a Lorentz force tending to expel said liquid metal therefrom toward the region between said intermediate electrode and said stator collector ring, said liquid metal further conducting electrical current between said intermediate electrode and said stator collector ring so as to create a Lorentz force tending to pump said liquid metal therefrom toward the region between said rotor collector ring and said intermediate electrode.

8. The apparatus of claim 7 wherein said intermediate electrode and said liquid metal form, at each of predetermined locations along said electrode, a single continuous current path extending between said rotor collector ring and said stator collector ring.

9. The apparatus of claim 7 wherein said intermediate electrode includes a plurality of pairs of axially-directed vanes disposed radially on the outer surface of said electrode, and insulation means on said electrode between the vanes of each pair so as to electrically isolate liquid metal between the vanes of each pair from the electrode whereby liquid metal between the vanes of each pair carries substantially no current and thereby experiences no Lorentz force.

10. A current collector for an acyclic machine comprising: a rotor collector ring; a stator collector ring encircling said rotor collector ring; and an intermediate collector electrode situated between said rotor collector ring and said stator collector ring, said electrode including liquid metal flow path-defining means permitting liquid metal to flow in one axial direction between said rotor collector ring and said electrode and to flow in either of said one axial direction and the opposite axial direction between said stator collector ring and said electrode, whereby electrical current flow between said rotor collector ring and said intermediate electrode is substantially continuous over the entire circumference of said electrode in contact with liquid metal and electrical current flow between said stator collector ring and said intermediate electrode occurs at intermittent locations over the entire circumference of said electrode in contact with liquid metal.

11. The apparatus of claim 10 wherein said flow path-defining means comprises an annular electrode having axially-oriented vanes disposed radially on the outer surface of said electrode and extending less than the entire axial width of said electrode, the axial ends of said electrode having notches between adjacent vanes thereof permitting circulation of liquid metal between the inner and outer surfaces of said electrode.

12. The apparatus of claim 11 wherein said annular electrode is completely coated with insulation except for a continuous strip on the inner circumference of said electrode and except for the region separating successive pairs of said adjacent vanes.

13. The apparatus of claim 12 wherein said annular electrode is of two different inner diameters.

14. The method of counteracting Lorentz forces on liquid metal in the current collector of an acyclic maching comprising:
passing electrical current from the rotor of said machine through said liquid metal between a rotor collector ring and an intermediate electrode so as to create an expulsion force acting in a first direction on said liquid metal;
channeling liquid metal expelled from between said rotor collector ring and said intermediate electrode to return to a region between a stator collector ring and said intermediate electrode; and
passing electrical current from said intermediate electrode to said stator collector ring so as to create a magnetohydrodynamic force on said liquid metal therebetween and pump said metal toward the region between said rotor collector ring and said intermediate electrode, thereby replenishing liquid metal expelled from between said rotor collector ring and said intermediate electrode.

15. The method of claim 14 wherein the electrical current passed through said liquid metal between the rotor collector ring and the intermediate electrode is the same electrical current passed from the intermediate electrode to said stator collector ring.

* * * * *